US008880715B2

(12) United States Patent
Bailey et al.

(10) Patent No.: US 8,880,715 B2
(45) Date of Patent: Nov. 4, 2014

(54) REMOTE CONTROL OF A HOST COMPUTER

(75) Inventors: Scott Bailey, Mission Viejo, CA (US); William C. Russell, Laguna Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1317 days.

(21) Appl. No.: 12/257,322

(22) Filed: Oct. 23, 2008

(65) Prior Publication Data

US 2010/0106766 A1   Apr. 29, 2010

(51) Int. Cl.
G06F 15/16 (2006.01)
H04L 29/06 (2006.01)

(52) U.S. Cl.
CPC .............. *H04L 69/16* (2013.01); *H04L 69/165* (2013.01); *H04L 67/38* (2013.01)
USPC ...................................................... 709/230

(58) Field of Classification Search
USPC ...................................................... 709/230
See application file for complete search history.

(56) References Cited

U.S. PATENT DOCUMENTS

| | | | |
|---|---|---|---|
| 5,990,852 A | 11/1999 | Szamrej | |
| 6,374,288 B1 * | 4/2002 | Bhagavath et al. ............ | 709/203 |
| 6,665,751 B1 * | 12/2003 | Chen et al. ...................... | 710/52 |
| 7,171,444 B2 | 1/2007 | Deshpande | |
| 7,299,304 B2 | 11/2007 | Saint-Hilaire et al. | |
| 2003/0012138 A1 * | 1/2003 | Abdelilah et al. ............. | 370/231 |
| 2003/0120747 A1 * | 6/2003 | Kim ................................ | 709/217 |
| 2003/0212811 A1 | 11/2003 | Thornton ........................ | 709/231 |
| 2004/0255017 A1 | 12/2004 | Jurisch et al. .................. | 709/223 |
| 2005/0081158 A1 * | 4/2005 | Hwang ............................ | 715/740 |
| 2005/0198189 A1 | 9/2005 | Robinson et al. | |
| 2006/0069797 A1 * | 3/2006 | Abdo et al. ..................... | 709/231 |
| 2006/0203007 A1 | 9/2006 | Bullard et al. | |
| 2006/0235991 A1 * | 10/2006 | Brown et al. ................... | 709/233 |
| 2006/0282855 A1 * | 12/2006 | Margulis .......................... | 725/43 |
| 2007/0038773 A1 | 2/2007 | White et al. ..................... | 709/233 |

OTHER PUBLICATIONS

TightVNC. techimo.com message board posting, http://www.techimo.com/forum/applications-operating-systems/75238-free-remote-desktop-utilities.html, Aug. 7, 2003. pp. 1-5.*

* cited by examiner

*Primary Examiner* — John MacIlwinen
(74) *Attorney, Agent, or Firm* — Fitzpatrick, Cella, Harper & Scinto (57) ABSTRACT

A host computer is remotely controlled by a remote client device over a network that carries transmissions in a connection-oriented protocol and a connectionless protocol. The host computer establishes a connection to the remote client device using a connection-oriented protocol, and receives commands from the remote client device over the connection-oriented protocol and implements the commands so as to affect a display of the host computer. The host computer transmits content of the display to the remote client device using the connection-oriented protocol. In addition, the host computer identifies one or more rapid-change areas in the display of the host computer in which the display is changing more quickly than a predetermined threshold rate of change, and transmits content of each rapid-change area to the remote client device using a connectionless protocol at a rate higher than the connection-oriented protocol.

16 Claims, 9 Drawing Sheets

REMOTE CONTROL OF A HOST COMPUTER

BACKGROUND

1. Field

The present invention generally concerns remote control of a host computer, in which a remote client device accepts user inputs to control the host computer and displays output from the host computer.

2. Description of the Related Art

Remote computing allows a user to control a host computer from a remote client device. A "remote" client device is a device which does not have physical access to the host computer. In remote computing, the client device displays what the host computer is displaying, and accepts input on behalf of the host computer, such as mouse movement or key presses.

In one method of displaying content of a host computer on a remote client device, the host computer repeatedly captures screenshots of the host computer display, and then transmits the screenshots to the client device. With this method, changes in the host computer display are eventually displayed on the remote client device.

SUMMARY

One problem with the capture and transmission of host computer screenshots is that the screenshots ordinarily are not captured and transmitted quickly enough to keep pace with rapidly changing content, such as movies or animations. Thus, an animation or movie on the host computer will appear on the client device as jerky or disjointed.

The present invention addresses the foregoing by providing control of a host computer from a remote client over a network that carries transmissions in a connection-oriented protocol and a connectionless protocol.

According to one aspect of the invention, a host computer is remotely controlled by a remote client device over a network that carries transmissions in a connection-oriented protocol and a connectionless protocol. The host computer establishes a connection to the remote client device using a connection-oriented protocol, and receives commands from the remote client device over the connection-oriented protocol and implements the commands so as to affect a display of the host computer. The host computer transmits content of the display to the remote client device using the connection-oriented protocol. In addition, the host computer identifies one or more rapid-change areas in the display of the host computer in which the display is changing more quickly than a predetermined threshold rate of change, and transmits content of each rapid-change area to the remote client device using a connectionless protocol at a rate higher than the connection-oriented protocol.

A connectionless protocol (such as UDP) is intrinsically faster than a connection-oriented protocol (such as TCP). As a consequence, because rapidly-changing areas in the display of the host are transmitted by using a connectionless protocol, the client can display these areas with greater fidelity to the original.

According to another aspect of the invention, a client device remotely controls a host computer over a network that carries transmissions in a connection-oriented protocol and a connectionless protocol. The client device establishes a connection to the host computer using a connection-oriented protocol, and transmits commands over the connection-oriented protocol to the host computer. The client device receives display content of the host computer over the connection-oriented protocol. In addition, the client receives rapid-change display content of the host computer over a connectionless protocol. The client device displays the received display content and the received rapid-change display content.

The foregoing provides transmission of movies and other rapidly-changing content to a client device using a protocol different from the rest of the display, and more suited to rapidly-changing content. Thus, movies and other rapidly-changing content on the host computer can be remotely displayed at a client device while reducing disjointed or jerky animations. Accordingly, movies and other rapidly-changing content are displayed at a better quality at the client device, improving the end user's experience.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION

Figure 1:
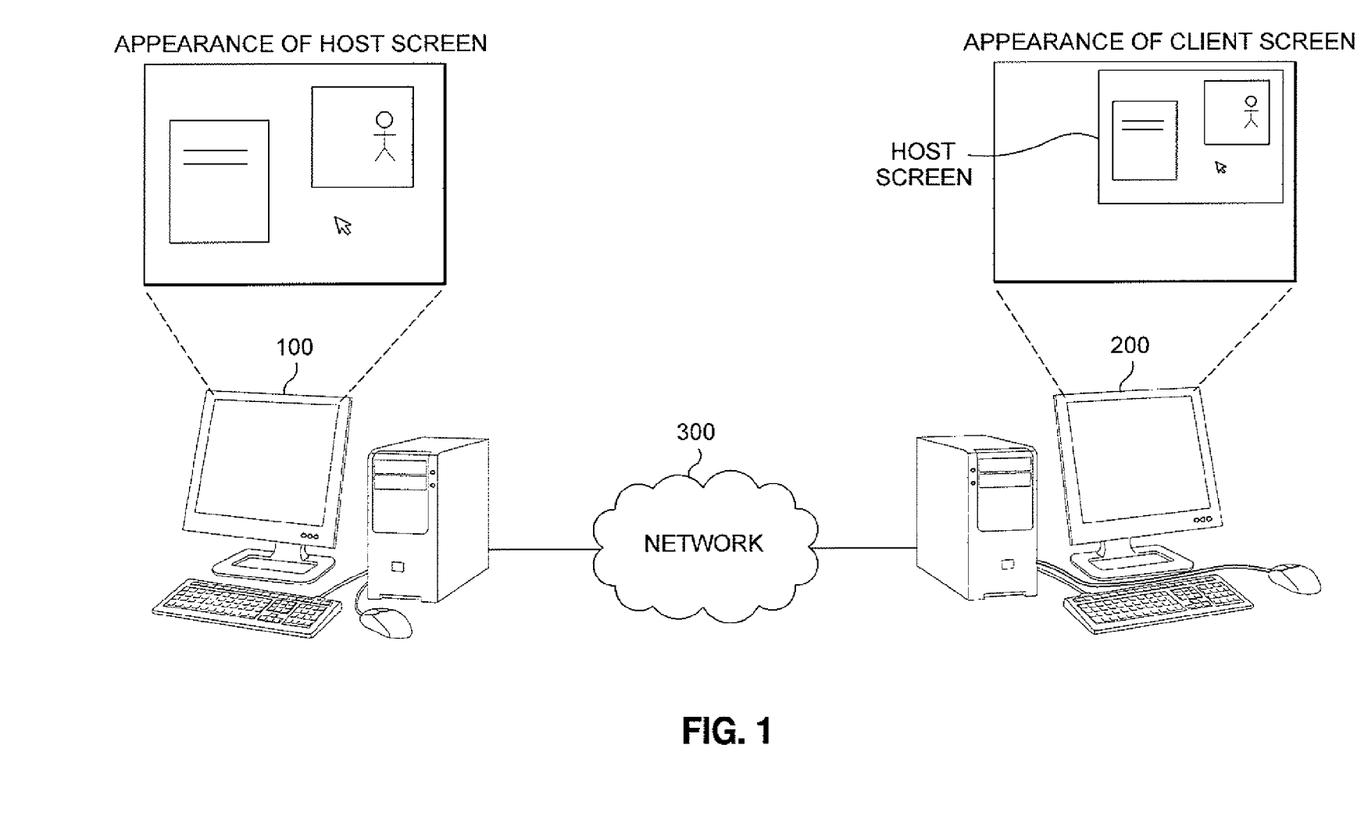
FIG. 1 illustrates an example of a client and host communicating in a network environment.

FIG. 1 illustrates an example environment in which the present invention may be practiced. Host computer 100 is connected to client device 200 via network 300. Host computer 100 and client device 200 communicate via network 300 to transmit data and commands. As seen in FIG. 1, client device 200 displays what host computer 100 is displaying, and includes input devices such as a mouse or keyboard for accepting inputs on behalf of host computer 100. Network 300 can be any type of network able to transmit data via both a connection-oriented protocol and a connectionless protocol.

A connection-oriented protocol is a networking protocol that delivers a stream of data to a recipient in the same order as it was sent, after first establishing a communication session. A connection-oriented protocol includes verification and tracking operations to ensure that a data packet is received at the correct position and order, and to document the path over which the packet was transmitted. One widespread example of a connection-oriented protocol is the TCP protocol, commonly used for web browsing. Other examples of connection-oriented protocols include DCCP, Connection-oriented Ethernet, Asynchronous Transfer Mode (ATM), Frame Relay, TIPC, SCTP and IPX/SPX.

A connectionless protocol is a networking protocol for communication between two network end points in which a message can be sent from one end point to another without prior arrangement. The device at one end of the communication simply transmits data to the recipient's address, without ensuring that the recipient is available and ready to receive the data, or tracking how or whether the data actually arrives. Connectionless protocols include RDP (commonly used in remote computing), UDP, ICMP, IPX, and TIPC, among many others. Connectionless protocols are ordinarily less reliable than connection-based protocols, since the sender simply transmits data to an address without regard to how or whether the data arrives at the intended recipient. On the other hand, connectionless protocols can transmit data faster than a connection-oriented protocol, since the connectionless protocols are more efficient. Thus, a greater bandwidth is obtainable. Moreover, in the context of remote display, the ability to detect and recover lost data as in connection-oriented protocols may be of little use, since by the time the lost data is detected and the retried data is sent, the screen context has already changed.

The particular implementation, scale and hardware of network 300 may vary according to different embodiments of the invention, as long as the implementation is able to transmit data via both a connection-oriented protocol and a connectionless protocol. Thus, for example, network 300 could be the Internet, a Local Area Network (LAN), Wide Area Network (WAN), Metropolitan Area Network (MAN), or Personal Area Network (PAN), among others. Network 300 can be wired or wireless, and can be implemented, for example, as an Optical fiber, Ethernet, or Wireless LAN network. In addition, the network topology of network 300 may vary.

Figure 2:
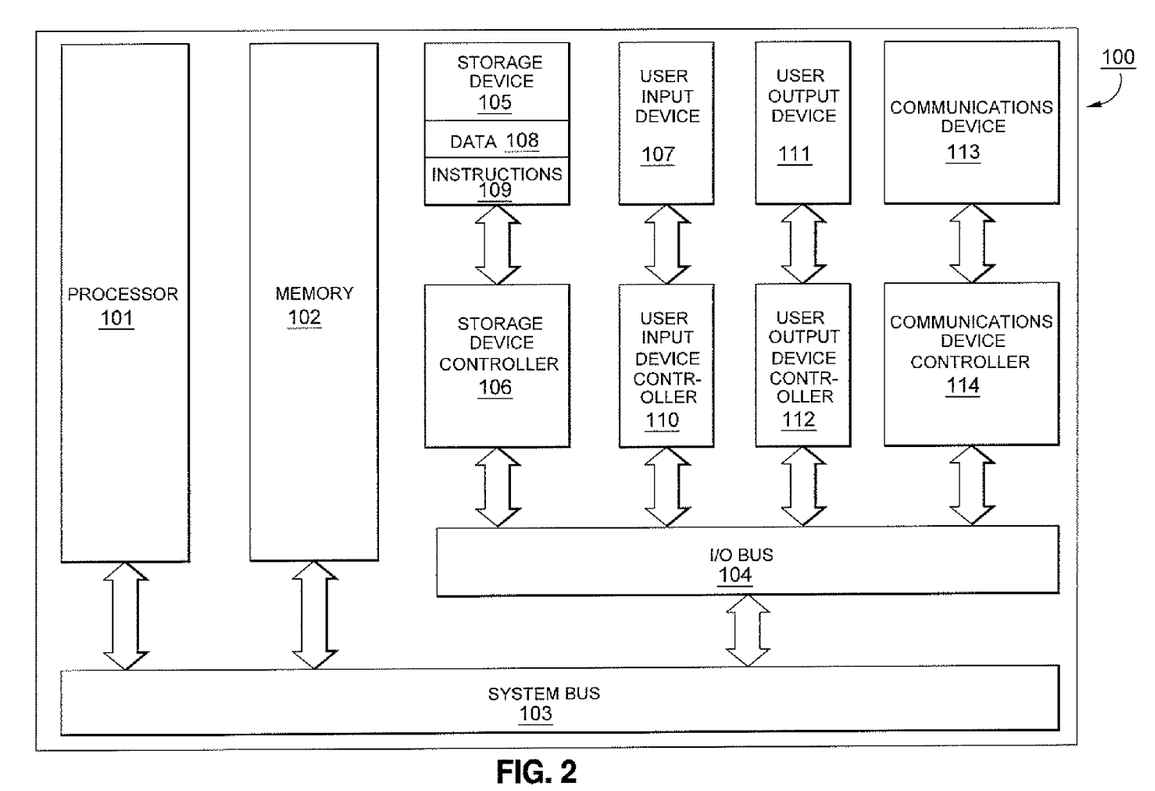
FIG. 2 illustrates an example embodiment of a host computer.

FIG. 2 is an architecture diagram of an example host computer. The elements may be implemented using hardcoded computational modules or other types of circuitry, or a combination of software and circuitry. Host computer 100 includes a processor 101 coupled to a memory 102 via system bus 103. Memory 102 can include, for example, a RAM, SDRAM, DDR SRAM, or flash memory. In operation, processor 101 loads the program instructions from storage device 105 into the memory 102. Processor 101 executes the loaded program instructions to implement a process for operating host computer 100 to be remotely controlled by remote client device 200 over network 300, and to transmit display data via a connection-oriented or connectionless protocol, as described in more detail below.

Processor 101 is also coupled to external Input/Output (I/O) devices via the system bus 103 and an I/O bus 104. More specifically, the processor may be coupled to a user output device 111 via a user output device controller 112 coupled to the I/O bus 104. Output device 111 can include hardware such as a display monitor or a screen, and the display monitor or screen may display content such as a word document along with more rapidly-changing content such as a media player. Output device controller 112 could be, for example, a separate video card or graphics controller. The processor 101 may be further coupled to a user input device 107 via a user input device controller 110 coupled to the I/O bus 104. Input devices can include hardware such as, for example, a keyboard, a mouse, a joystick, a trackball or a game controller, which allow a user of host computer 100 to input commands. In remote computing, however, client device 200 can also input commands to host computer 100, in a process which will be described in more detail below.

A storage device 105 having computer-readable media is coupled to the processor 101 via a storage device controller 106, the I/O bus 104 and the system bus 103. For example, storage device 105 could include a hard disk drive. In one implementation, storage device 105 is used by processor 101 to store and read data 108 and program instructions 109 to be loaded into memory 102 in order to execute a process for operating host computer 100 to be remotely controlled by remote client device 200 over network 300, and to transmit display data via a connection-oriented or connectionless protocol, as described in more detail below.

The processor 101 is further coupled to a communications device 113 via a communications device controller 114 coupled to the I/O bus 104. The processor uses the communications device 113 to communicate with another device over network 300. More specifically, communication device 113 allows host computer 100 to communicate with client device 200 over network 300. In this regard, communications device 113 may be a network interface card (NIC) and may be configured to transmit data via a multitude of protocols, and is able to at least transmit data over at least one connection-oriented protocol and at least one connectionless protocol. To that end, communications device 113 may include multiple hardware interfaces or ports to allow communication via different transmission protocols.

Figure 3:
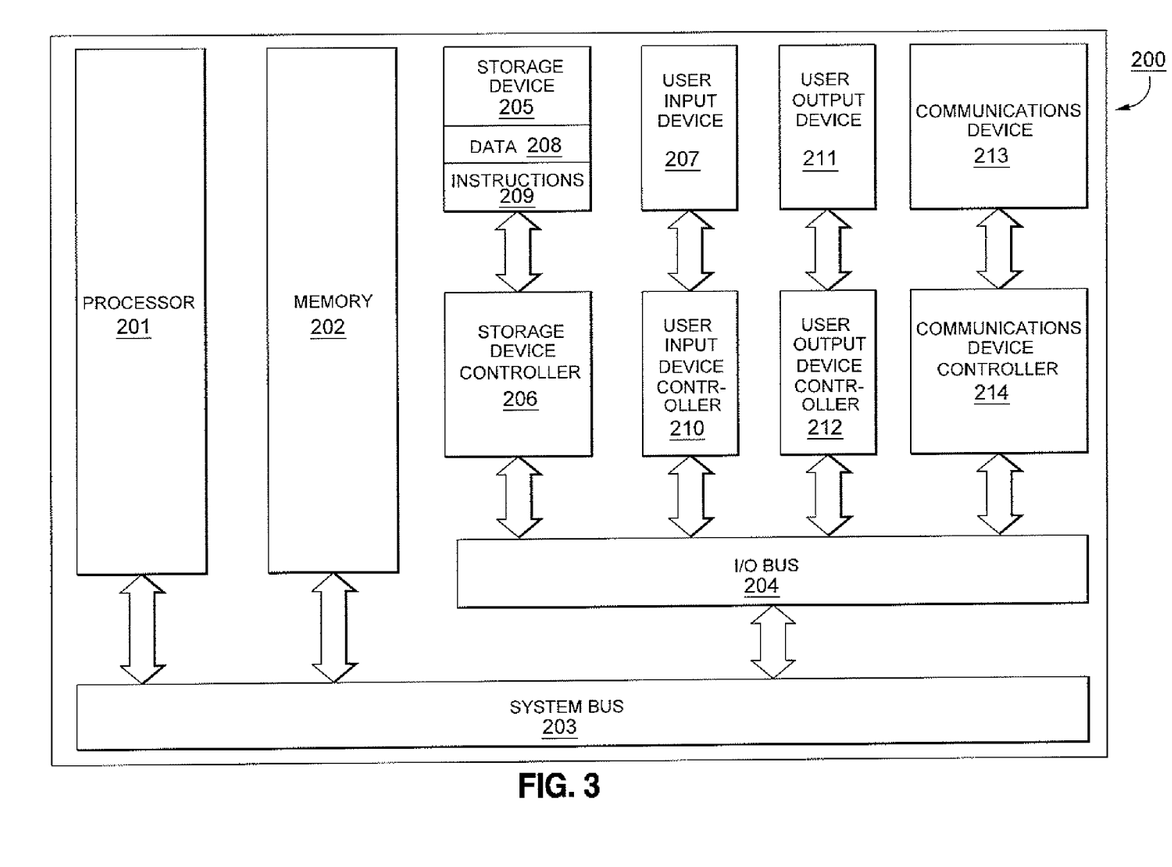
FIG. 3 illustrates an example embodiment of a client device.

FIG. 3 is an architecture diagram of an example embodiment of a client device. The elements may be implemented using hardcoded computational modules or other types of circuitry, or a combination of software and circuitry. Client device 200 includes a processor 201 coupled to a memory 202 via system bus 203. Memory 202 can include, for example, a RAM, SDRAM, DDR SRAM, or flash memory. In operation, processor 201 loads the program instructions from storage device 205 into the memory 202. Processor 201 executes the loaded program instructions to implement a process to remotely control host computer 100 over network 300, as explained in more detail below.

Processor 201 is also coupled to external Input/Output (I/O) devices via the system bus 203 and an I/O bus 204. More specifically, processor 201 may be further coupled to a user output device 211 via a user output device controller 212 coupled to the I/O bus 204. The output devices can include, for example, a display monitor or a screen, and the display monitor or screen may display content such as a word document along with more rapidly-changing content such as a media player. In remote computing, the display on output device 211 can include or mirror the display on output device 111 at host computer 100. Output device controller 212 could be, for example, a separate video card or graphics controller. The processor 201 may be further coupled to a user input device 207 via a user input device controller 210 coupled to the I/O bus 204. Input devices can include hardware such as, for example, a keyboard, a mouse, a joystick or a game controller, among many others. The input devices at client device 200 can be used to send input to client device 200. According to the invention, however, input device 207 at the client device 200 also accepts commands on behalf of host computer 100, such as user interface commands.

A storage device 205 having computer-readable media is coupled to the processor 201 via a storage device controller 206, the I/O bus 204 and the system bus 203. For example, storage device 205 could include a hard disk drive. In one implementation, storage device 205 is used by processor 201 to store and read data 208 and program instructions 209 to be loaded into memory 202 in order to execute a process for operating client device 200 to remotely control host computer 100 over network 300, as explained in more detail below.

The processor 201 is further coupled to a communications device 213 via a communications device controller 214 coupled to the I/O bus 204. The processor may use the communications device 213 to communicate with another device over network 300. More specifically, communication device 213 allows client device 200 to communicate with host computer 100 over network 300. In this regard, communications device 213 be a network interface card (NIC) and may be configured to transmit data via a multitude of protocols, and is able to at least transmit data over at least one connection-oriented protocol and at least one connectionless protocol. To that end, communications device 213 may include multiple hardware interfaces or ports to allow communication via different transmission protocols.

Physically, client device 200 can be embodied as a number of devices, including, for example, a computer as shown in FIG. 1, a cellular telephone, a personal digital assistant (PDA), laptop computer, or a television, among many other embodiments.

During remote computing, client device 200 acts as a separate input/output for host computer 100. Specifically, in the client device, client device 200 displays what host computer 100 is displaying, and accepts input, such as user interface commands like mouse movement or key presses. Client device 200 transmits inputs to host computer 100, which implements the user's input.

In more detail, host computer 100 and client device 200 establish a connection-oriented protocol, so that the client device 200 can transmit user interface commands over network 300 to control host computer 100. For example, a user on client device 200 may click on a desktop folder in order to open it. This command is transmitted to host computer 100 via a connection-oriented protocol such as TCP, and host computer 100 implements the command to adjust its display (e.g., showing the contents of the opened desktop folder). Host computer 100 then transmits the updated display to client device 100 for display to the user.

However, as mentioned above, screenshots from host computer 100 are not always captured and transmitted quickly enough to keep pace with rapidly changing content, such as movies or animations.

Therefore, a process of displaying content of the host computer on the remote client device will now be described with respect to FIGS. 4 to 9.

The process of remote computing will be described from the perspective of host computer 100 with respect to FIG. 4, and from the perspective of client device 200 with respect to FIG. 5. It should be understood that some steps in the processes are performed continuously, or only as needed, and therefore that the particular order and sequence of steps might change. In this regard, the process in the host computer 100 can be stored in storage device 105 as process steps which are executed by processor 101 to perform the functionality of host computer 100. Conversely, the process in the client device 200 can be stored in storage device 205 as process steps which are executed by processor 201 to perform the functionality of the client device 200.

Figure 4:
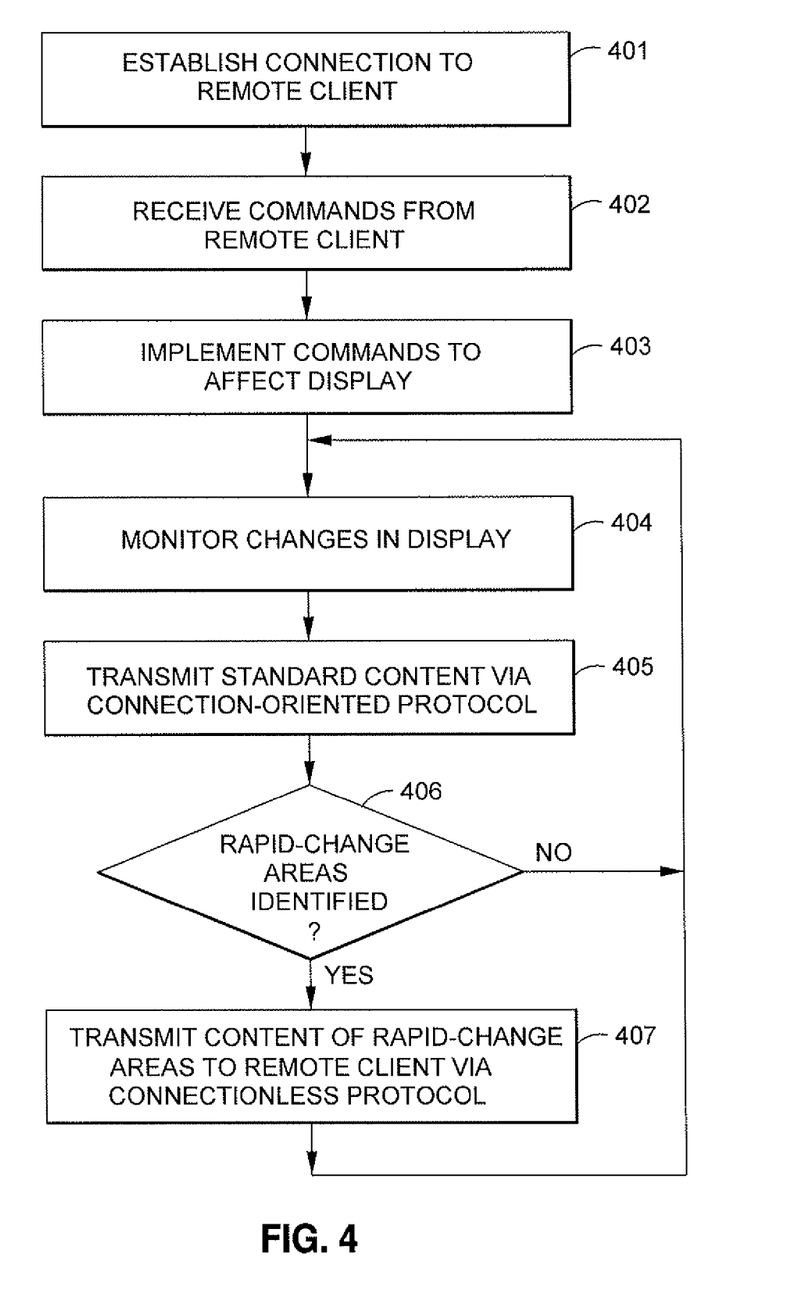
FIG. 4 is a flowchart illustrating an example process in the host computer.

Briefly, as shown in FIG. 4, host computer 100 establishes a connection to remote client device 200 using a connection-oriented protocol, and receives commands from remote client device 200 over the connection-oriented protocol and implements the commands so as to affect a display of host computer 100. Host computer 100 transmits content of the display to remote client device 200 using the connection-oriented protocol. In addition, host computer 100 identifies one or more rapid-change areas in the display of host computer 100 in which the display is changing more quickly than a predetermined threshold rate of change, and transmits content of each rapid-change area to remote client device 200 using a connectionless protocol at a rate higher than the connection-oriented protocol.

Turning to FIG. 4, the process in host computer 100 starts in step 401, where a connection is established with remote client device 200. This is done via a connection-oriented protocol, to establish a basic remote computing connection between host computer 100 and client device 200. The connection might be initialized by host computer 100, but more commonly it is client device 200 that initializes the connection.

In step 402, host computer 100 receives commands from client device 200. For example, common commands would include user interface commands input at client device 200, such as a key press or movement of a cursor via a mouse.

In step 403, host computer implements the commands from client device 200 to affect the display, as if the user at client device 200 were sitting at the host computer. Thus, for example, host computer 100 adjusts its display to correspond to a user clicking on a desktop folder.

In step 404, host computer 100 monitors the display on its display device 111 to track how quickly content on the display is changing. This step can be accomplished using various methods. For example, host computer 100 could continuously take screen shots, and compare the different screen shots to generate a "heat map" of how fast certain pixel areas are changing. Alternatively, host computer 100 could use a software "hook" into the operating system to monitor high-level events or commands in the operating system which correspond to changes in the display. In yet another method, host computer 100 could access a video card buffer to determine where pixels are being drawn. More specifically, if host computer 100 includes a video card (not shown), the operating system in host computer 100 will be sending commands to the video card for the display. In still another method, the invention could eavesdrop on video card commands at a hardware level. For example, a hardware connection could provide raw access to drawing commands in the video card command buffer or commands being transmitted from the video card to the display.

In step 405, host computer 100 transmits low-rate (i.e., not rapidly changing) display content via the connection-oriented protocol.

In step 406, host computer 100 identifies any rapid-change areas in the display. More specifically, using the monitoring techniques discussed above, host computer 100 determines whether any areas of the display are changing faster than a predetermined threshold rate of change. The threshold rate of change could be set by the user, or could be set based on the capabilities of the display of the client device, or abilities of the human eye. For example, around 25 frames/second or less, the human eye starts to notice irregularities in displayed animations or video. Thus, the threshold could be set at 25 frames/second. The rapid-change display areas are then flagged to be streamed via a connectionless video streaming protocol, such as RDP.

In step 407, host computer 100 transmits data for any rapid-change areas to client device 200 via a connectionless protocol, such as RDP. The above process then returns to step 404, to continuously monitor for rapid-change areas as above. In this regard, if an area's rate of change falls below the threshold, it can return to streaming over the connection-oriented protocol.

The above process can be implemented as a service running in the background of host computer 100, for example as an executable file running in parallel with the rest of the system.

In one implementation, host computer 100 could issue a notification to client device 200, to let client device 200 know to expect a rapidly changing video stream. For example, host computer 100 might notify client device 200 to expect a video stream, along with coordinates defining the location of the rapid-change area. This notification would preferably be sent over a connection-oriented protocol such as TCP, in order to ensure that client device 200 is notified of the incoming stream. Client device 200 could then open a port for the data at the proper location, and send an acknowledgment to host computer 100. Host computer 100 could then wait for an acknowledgment from client device 200 (also via TCP) before transmitting the data.

In addition, host computer 100 and client device 200 could negotiate a preferred connectionless protocol. For example, upon receiving a notification to expect a video stream via the connectionless protocol, client device 200 could transmit a list of supported encoding methods to host computer 100. Host computer 100 could then select a preferred encoding method based on one or more factors, including host or client device's abilities (e.g., speed or display capabilities), the protocol encoders or decoders available at host computer 100 or client device 200, preferences set by the user or by the system, the bandwidth of the connection or other properties of network 300, or other factors. As with the notification, it is preferable to conduct this negotiation over a connection-oriented protocol such as TCP, so as to ensure that host computer 100 and client device 200 are ready to transmit a data stream via the connectionless protocol.

Host computer 100 could also implement more than one threshold rate of change. For example, host computer 100 might set the main threshold at 30 frames/second. Thus, an area changing more than 30 frames/second would switch to a connectionless protocol for faster transmission, as described above. In this example, however, a second threshold could be set at a lower rate (e.g., 27 frames/second) which must be passed before reverting to a connection-oriented mode, so that a brief slowdown in video or animation does not lead to an immediate switch back to the slower connection-oriented protocol.

In addition, time delays could be set in order to fine-tune the switches between protocols in particular cases. For example, there could be a set time delay once the rate of change of a rapid-change area falls below the main threshold, before immediately switching back to a connection-oriented mode. Host computer 100 could also implement a time delay upon start-up, so that normal changes in the display during start-up do not immediately cause a switch to connectionless protocol.

In still another aspect, host computer 100 could include exceptions or special processes to handle special display items. For example, a mouse arrow or cursor on the host screen can appear as a rapidly moving object as it moves across the screen, but displaying the cursor does not require a separate connectionless video stream. One method to address this special case is to exclude the host cursor from the calculation of rapidly-changing areas. Thus, the display of host cursor is essentially ignored at host computer 100. However, the position of the host cursor could still be sent across the command channel to render the cursor locally at client device 200 for the user. In addition, other objects that appear with limited periodicity, such as an animated GIF, could be recorded, ignored in the calculation, and redrawn independently on client device 200. This action could be taken even below the threshold rate of change for rapidly changing areas, to reduce the bandwidth needed to redraw the client screen.

The process from the perspective of client device 200 will now be described with respect to FIG. 5.

Figure 5:
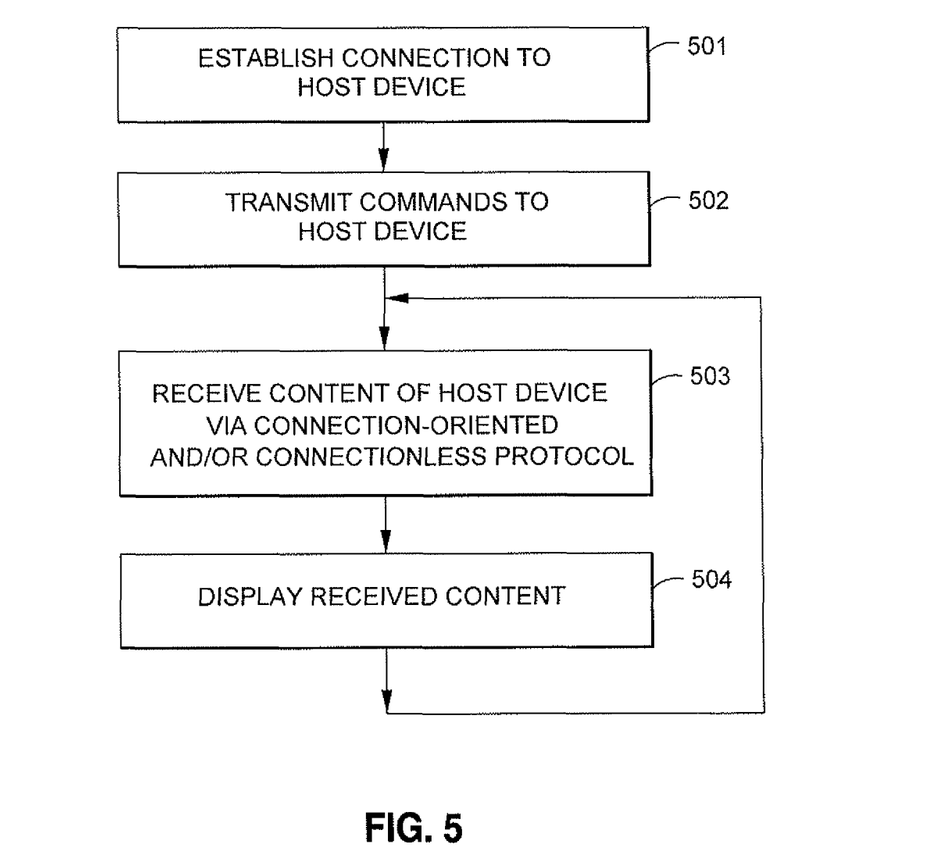
FIG. 5 is a flowchart illustrating an example process in the client device.

Briefly, in FIG. 5, client device 200 establishes a connection to host computer 100 using a connection-oriented protocol, and transmits commands over the connection-oriented protocol to host computer 100. Client device 200 receives display content of host computer 100 over the connection-oriented protocol. In addition, client device 200 receives rapid-change display content of host computer 100 over a connectionless protocol. Client device 200 displays the received display content and the received rapid-change display content.

In step 501, client device 200 establishes a connection to host computer 100 via a connection-oriented protocol.

In step 502, client device 200 transmits commands to host computer 100 to control host computer 100. For example, client device 200 could transmit user interface commands to host computer 100 such as key inputs or mouse movements.

In step 503, client device 200 receives content from host computer 100 via a connection-oriented protocol or connectionless protocol. As discussed above, host computer 100 may transmit data for display via a connection-oriented protocol or connectionless protocol, based on how quickly the displayed data is changing. In this regard, client device 200 may open a port for rapid-change data in response to a notification from host computer 100, and may transmit a list of supported encoding methods as discussed above.

In step 504, the client device displays the data received from host computer 100, providing the user with a remote view of the display of host computer 100, including any rapidly-changing areas.

Figure 6:
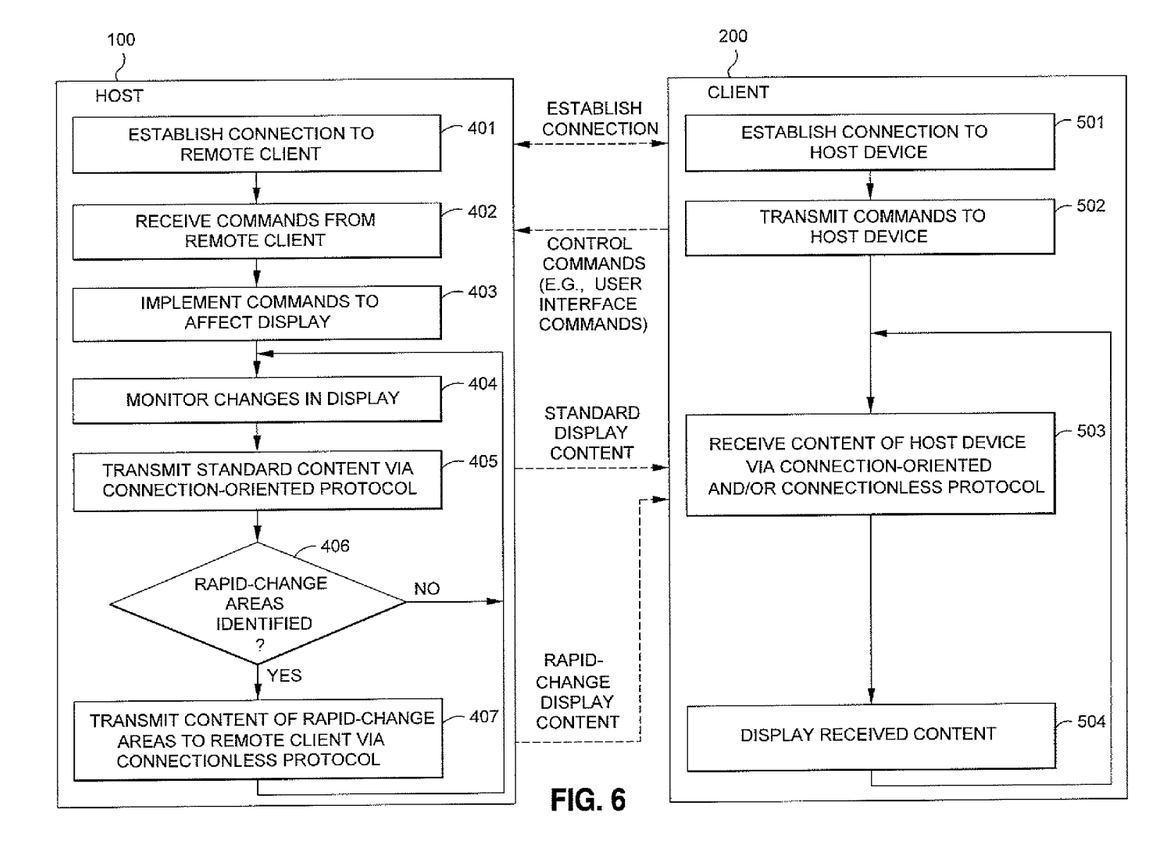
FIG. 6 illustrates interactions between the processes of the host computer and the client device.

FIG. 6 is a flow diagram illustrating interactions between the processes of host computer 100 and client device 200. As can be seen from FIG. 6, both host computer 100 and client device 200 establish a connection over a connection-oriented protocol. Host computer 100 receives commands (e.g., user interface commands) from client device 200, and transmits display content and rapidly changing display content via connection-oriented and connectionless protocols, respectively. Client device 200 transmits commands to host computer 100, and receives content of host computer 100 via the connection-oriented protocol and/or the connectionless protocol.

Figure 7:
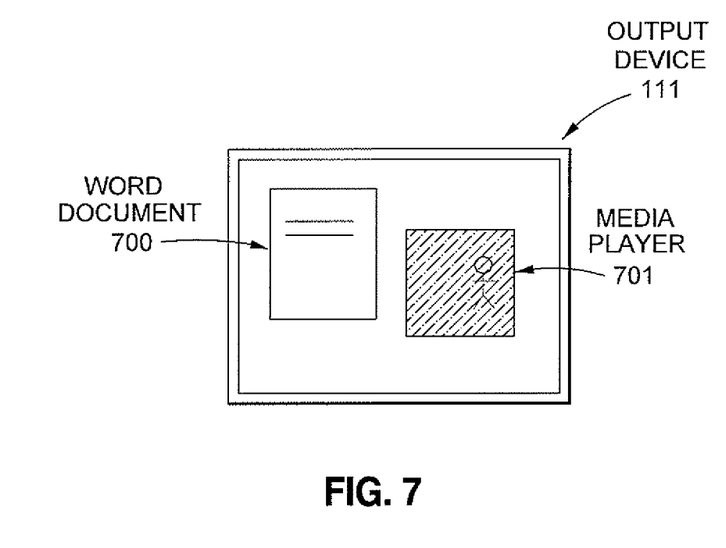
FIG. 7 illustrates an example of a display on the host computer.

FIG. 7 illustrates an example of a display on host computer 100. Output device 111 (e.g., a screen) displays content from the host computer, such as word document 700 and media player 701. For purposes of this example, word document 700 is a document opened in a word processing program, such as Microsoft Word, whereas media player 701 is an application displaying animations or video, such as .MPEG files.

Figure 8:
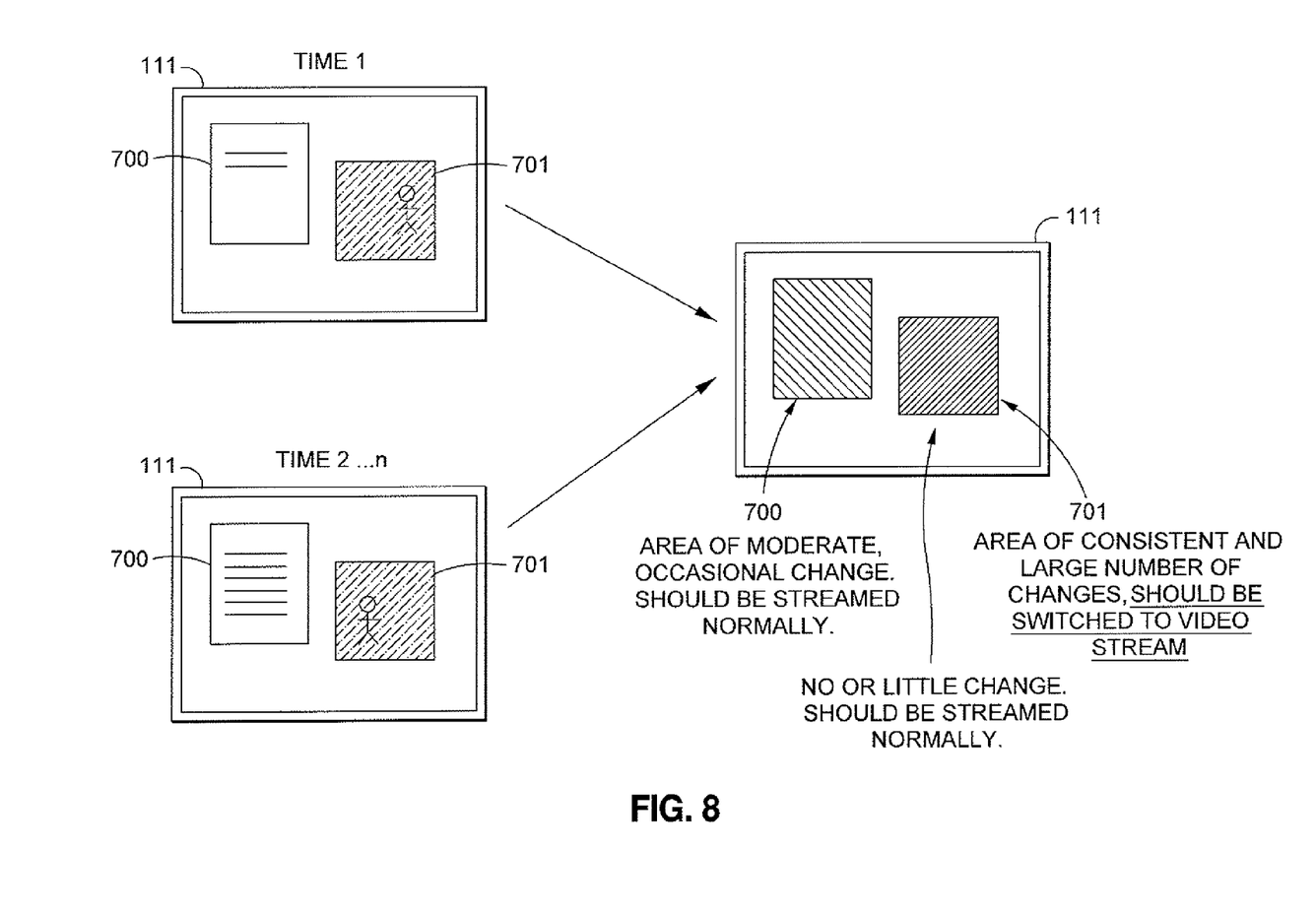
FIG. 8 illustrates examples of different stages of a display on the host computer.

FIG. 8 illustrates examples of different stages of a display on the host computer 100. As discussed above, the invention determines how quickly different sections of the display are changing, and uses this information to decide whether to change the transmission method for the area. In the example of FIG. 8, the invention determines that the rate of change of the display area corresponding to word document 700 is moderate. Since this area is not changing quickly, a faster transmission method is not necessary, and the area can be streamed via the connection-oriented protocol. Other areas of the display with little or no change are also streamed via the connection-oriented protocol. On the other hand, the display area corresponding to media player 701 is determined to be changing consistently and rapidly. As such, the invention determines that the content for this display area should be transmitted as a video stream via a connectionless protocol, rather than by connection-oriented transmission methods.

Figure 9:
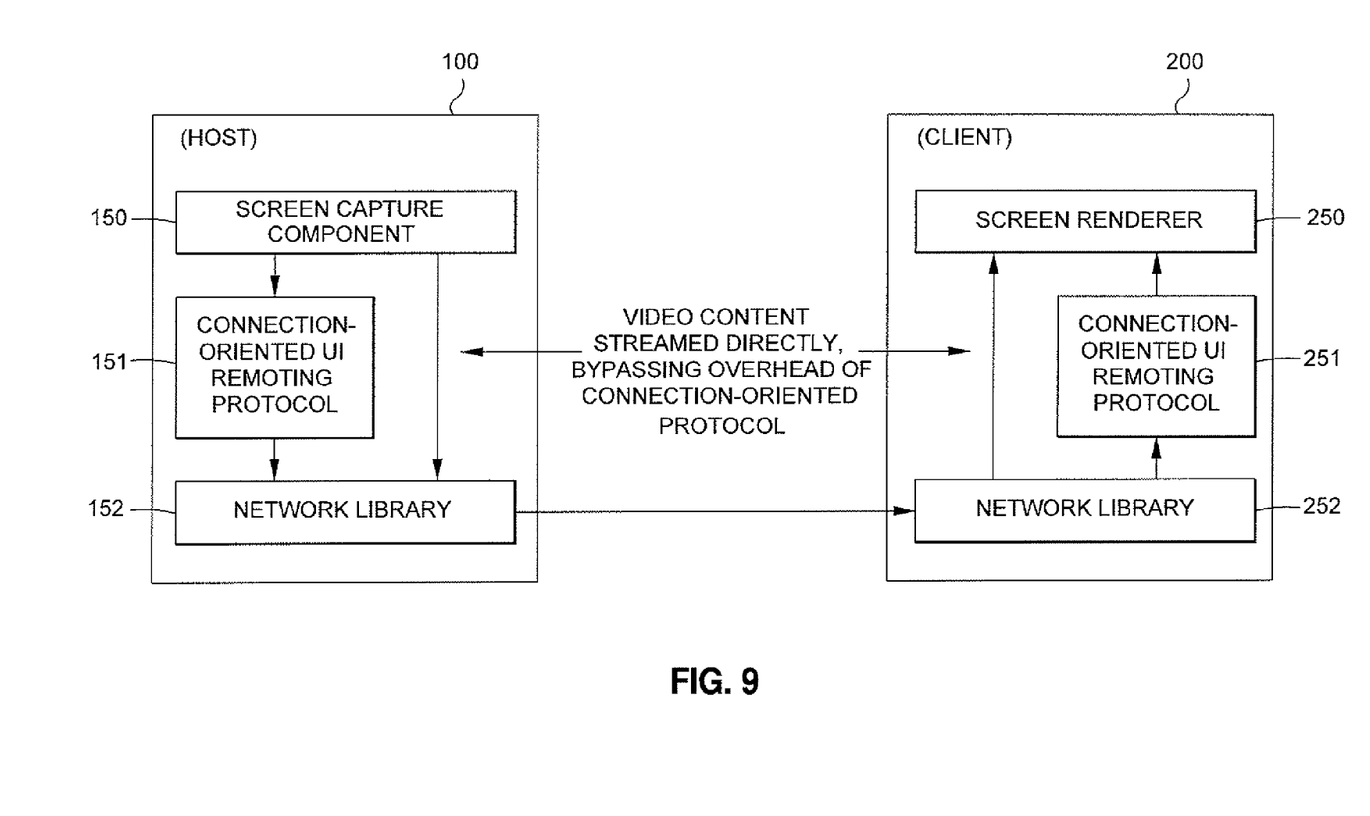
FIG. 9 illustrates a conceptual view of the different transmission methods between the host computer and the client device.

FIG. 9 illustrates a basic conceptual view of communication between host computer 100 and client device 200. Host computer 100 includes screen capture component 150 for capturing the display on output device 111. In a connection-oriented transmission method, data is transmitted via connection-oriented user interface (UI) remoting protocol 151. UI remoting protocol 151 is a connection-oriented protocol such as TCP. As mentioned above, connection-oriented protocols include checking and verification processes to ensure that a data packet arrives at its destination, and to keep track of how the data packet moved throughout the network. On the other hand, this overhead requires extra time, slowing down the speed of data transmission. Host computer 100 and client device 200 include network libraries 152 and 252, respectively, including information for supporting various networks. In communication with client device 200 via a connection-oriented protocol, host 100 transmits data packets to client device 200, which uses connection-oriented remoting protocol 251 to receive screen displays, which are then rendered on the client device by screen renderer 250.

According to the present invention, however, rapidly changing display content is streamed directly between host computer 100 and client device 200 via a connectionless protocol, thus bypassing the overhead of connection-oriented protocols. Of course, some basic encoding and/or decoding might be necessary to send the data to client device via the connectionless protocol, but for purposes of simplicity, any extra encoders or decoders are not shown in FIG. 9.

By virtue of the above-described arrangements, movies and other rapidly-changing content are transmitted to a client device using a protocol different from the rest of the display, and more suited to rapidly-changing content. Thus, movies and other rapidly-changing content on the host computer can be remotely displayed at a client device while reducing disjointed or jerky animations. Accordingly, movies, and other rapidly-changing content are displayed at a better quality at the client device.

The exemplary embodiments of the invention have been described above with respect to particular illustrative embodiments, however, various changes and modifications may be made without departing from the scope of the invention. For example, in general, steps of methods described above may be performed in a different order and still achieve desirable results.

What is claimed is:

1. A method of operating a host computer which is remotely controlled by a remote client device over a network that carries transmissions in a connection-oriented protocol and a connectionless protocol, comprising:
   establishing a connection to the remote client device using a connection-oriented protocol;
   receiving commands from the remote client device over the connection-oriented protocol and implementing the commands so as to affect a display of the host computer;
   identifying the one or rapid-change areas in the display of the host computer in which the display is changing more quickly than a predetermined threshold rate of change;
   determining protocols for transmitting content of the display of the host computer to the remote client device such that content of each rapid-change area is transmitted to the remote client device using a connectionless protocol, and such that content of the display except the rapid-change areas is transmitted to the remote client device using the connection-oriented protocol;
   transmitting content of the display of the host computer to the remote client device using the determined protocol, wherein a rate of transmitting of the connectionless protocols is higher than a rate of transmitting of the connection-oriented protocol;
   wherein if the host computer determines that the rate of change for a rapid-change area falls below a second threshold rate of change lower than the threshold rate of change, the host computer changes the protocol for transmitting the content of the rapid-change area from the connectionless protocol to the connection-oriented protocol.

2. A method according to claim 1, wherein rapid-change areas are identified by comparing screenshots of the display of the host computer.

3. A method according to claim 1, wherein rapid-change areas are identified by monitoring display commands sent by an operating system of the host computer.

4. A method according to claim 1, wherein rapid-change areas are identified by monitoring drawing commands sent from a video card in the host computer.

5. A method according to claim 1, wherein the predetermined threshold rate of change is set based on display properties of the remote client device.

6. A method according to claim 1, wherein the host computer notifies the remote client device to expect data via the connectionless protocol, and transmits coordinates defining the location of the rapid-change area to the remote client device.

7. A method according to claim 1, further comprising selecting a type of connectionless protocol based on one or more of the following:
   a selection made by the user;
   encoders or decoders available at the host computer and the remote client device;
   a bandwidth of the connection; and
   display capabilities of the remote client device.

8. A method according to claim 1, wherein if the rate of change for a rapid-change area falls below the threshold rate of change, the host computer delays for a period of time before switching back to a connection-oriented protocol for the rapid-change area.

9. A method according to claim 1, wherein the host computer temporarily delays identifying rapid-change areas during start-up of the host computer.

10. A method according to claim 1, wherein certain display icons or areas are excluded from the identifying step.

11. A method according to claim 10, wherein a host cursor is excluded from the identifying step, and wherein the position of the host cursor is transmitted to the remote client device to locally redraw the host cursor on the remote client device.

12. A host computer which is controlled by a remote client device over a network which carries transmissions in a connection-oriented protocol and a connectionless protocol, the host computer comprising:
   a hardware network interface constructed to establish a connection to the remote to the remote client device using a connection-oriented protocol;
   said hardware network interface constructed to receive commands from the remote client device over the connection oriented protocol;
   a hardware processor constructed to implement the commands so as to affect the display of the host computer;
   an identification unit constructed to identity one or more rapid-change areas in the display of the host computer in which the display is changing more quickly than a predetermined threshold rate of change;
a determining unit that determines protocols for transmitting content of the display of the host computer to the remote client device such that the content of each rapid-change area is transmitted to the remote client device using a connectionless protocol, and such that content of the display except the rapid-change areas is transmitted to the remote client using the connection-oriented protocol;
said hardware network interface constructed to transmit content of the display of the host computer to the remote client device using the protocols determined by the determining unit wherein a rate of transmitting of the connectionless protocol is higher than a rate of transmitting of the connection-oriented protocol;
wherein if the host computer determines that the rate of change for a rapid-change area falls below a second threshold rate of change lower than the threshold rate of change, the host computer changes the protocol for transmitting the content of the rapid-change area from the connectionless protocol to the connection-oriented protocol;
a non-transitory computer-readable memory constructed to store computer-executable process steps; and
a hardware processor constructed to function as at the determining unit and the identification unit by executing the computer-executable process steps stored in memory.

13. A non-transitory computer-readable storage medium for retrievably storing a computer-executable program for operating a host computer which is remotely controlled by a remote client device over a network that carries transmissions in a connection-oriented protocol and a connectionless protocol, said program comprising the steps of:
establishing a connection to the remote client device using a connection-oriented protocol;
receiving commands from the remote client device over the connection-oriented protocol and implementing the commands so as to affect a display of the host computer;
identifying one or more rapid-change areas in the display of the host computer in which the display is changing more quickly than a predetermined threshold rate of change;
determining protocols for transmitting content of the display of the host computer to the remote client device such that content of each rapid-change area is transmitted to the remote client device using a connectionless protocol, and such that content of the display except the rapid-change area is transmitted to the remote client device using the connection-oriented protocol;
transmitting content of the display of the host computer to the remote client device using the determined protocols, wherein a rate of transmitting of the connectionless protocol is higher than a rate of transmitting of the connection-oriented protocol;
wherein if the host computer determines that the rate of change for a rapid-change area falls below a second threshold rate of change lower than the threshold rate of change, the host computer changes the protocol for transmitting the content of the rapid-change area from the connectionless protocol to the connection-oriented protocol.

14. A method of operating a client device to remotely control a host computer over a network that carries transmissions in a connection-oriented protocol and a connectionless protocol, comprising:
establishing a connection to the host computer using a connection-oriented protocol;
transmitting commands over the connection-oriented protocol to the host computer;
receiving content of a rapid-change area in a display of the host computer over a connectionless protocol and receiving content of the display except the rapid-change area over the connection-oriented protocol, wherein the rapid-change area is an area changing more quickly than a predetermined threshold rate of change;
displaying the received content of the rapid-change area and the received content of the display except the rapid-change area;
wherein if the host computer determines that the rate of change for a rapid-change area falls below a second threshold rate of change lower than the threshold rate of change, the host computer changes the protocol for transmitting the content of the rapid-change area from the connectionless protocol to the connection-oriented protocol.

15. A client device that remotely controls a host computer over a network that carries transmissions in a connection-oriented protocol and a connectionless protocol, comprising:
an interface unit constructed to establish a connection to the host computer using a connection-oriented protocol;
a transmission unit constructed to transmit commands over the connection-oriented protocol to the host computer;
a receiving unit constructed to receive content of a rapid-change area in a display of the host computer over a connectionless protocol and to receive content of the display except the rapid-change area over the connection-oriented protocol, wherein the rapid-change area is an area changing more quickly than a predetermined threshold rate of change, wherein if the host computer determines that the rate of change for a rapid-change area falls below a second threshold rate of change lower than the threshold rate of change, the host computer changes the protocol for transmitting the content of the rapid-change area from the connectionless protocol to the connection-oriented protocol;
a display unit constructed to display the received content of the rapid-change area and the received content of the display except the rapid-change area;
a non-transitory computer-readable memory constructed to store computer-executable process steps; and
one or more hardware processors constructed to function as the interface unit, transmission unit and receiving unit by executing the computer-executable process steps stored in memory.

16. A non-transitory computer readable storage medium for retrievably storing a computer program for a client device which remotely controls a host computer over a network that carries transmissions in a connection-oriented protocol and a connectionless protocol, said program comprising the steps of:
establishing a connection to the host computer using a connection-oriented protocol;
transmitting commands over the connection-oriented protocol to the host computer;
receiving content of a rapid-change area in a display of the host computer over a connectionless protocol and receiving content of the display except the rapid-change area over the connection-oriented protocol, wherein the rapid-change area is an area changing more quickly than a predetermined threshold rate of change; and displaying the received content of the rapid-change area and the received content of the display except the rapid-change area;

wherein if the host computer determines that the rate of change for a rapid-change area falls below a second threshold rate of change lower than the threshold rate of change, the host computer changes the protocol for transmitting the content of the rapid-change area from the connectionless protocol to the connection-oriented protocol.

\* \* \* \* \*